July 4, 1961   L. PÉRAS   2,990,941
LOAD DRIVING MEMBERS OF CONVEYORS

Filed March 31, 1958   2 Sheets-Sheet 1

INVENTOR
Lucien Péras
ATTORNEYS

July 4, 1961
L. PÉRAS
2,990,941
LOAD DRIVING MEMBERS OF CONVEYORS
Filed March 31, 1958
2 Sheets-Sheet 2
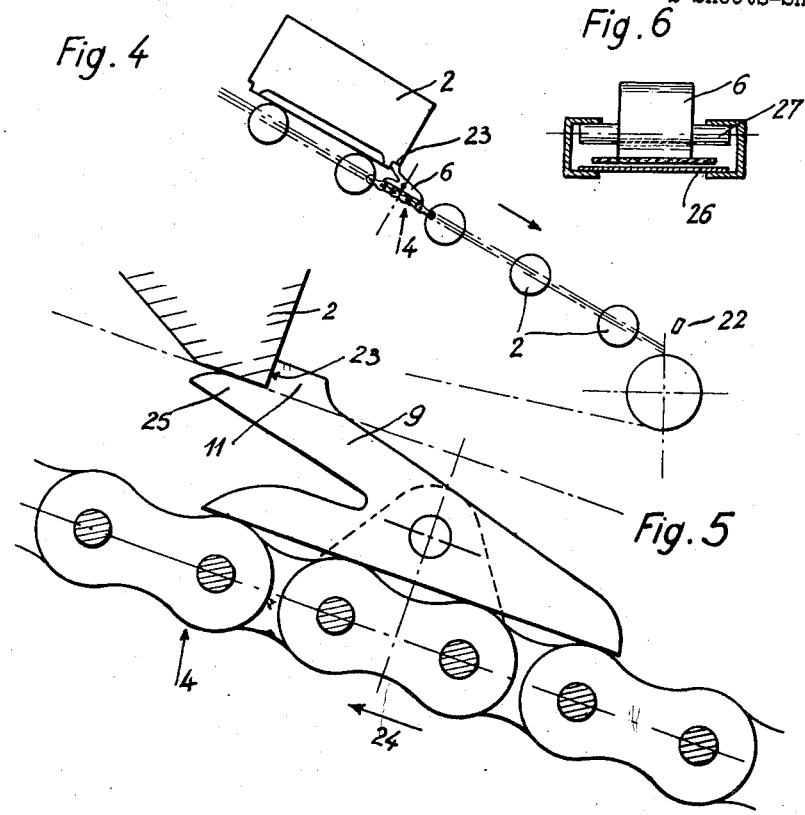
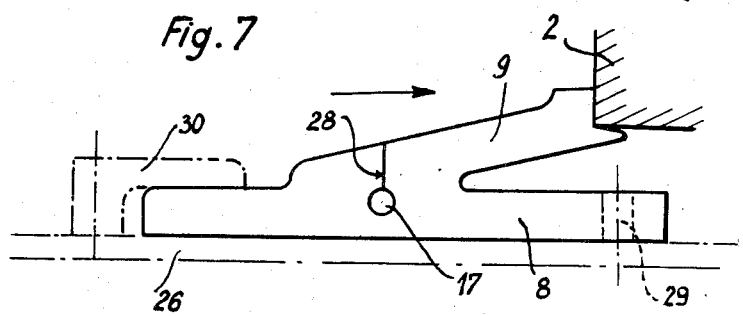
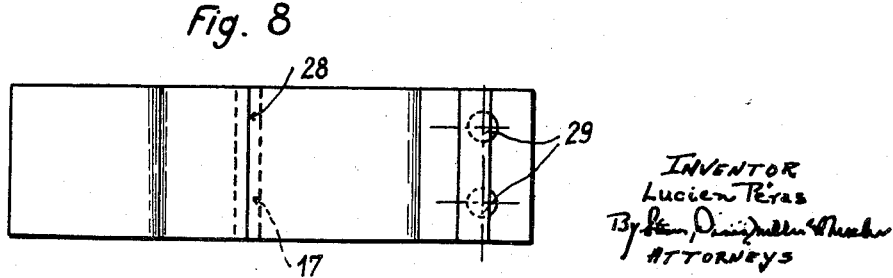
INVENTOR
Lucien Péras
ATTORNEYS United States Patent Office 2,990,941
Patented July 4, 1961

2,990,941
LOAD DRIVING MEMBERS OF CONVEYORS
Lucien Péras, Billancourt, France, assignor to Regie Nationale des Usines Renault, Billancourt, France, a French works
Filed Mar. 31, 1958, Ser. No. 724,947
Claims priority, application France Apr. 9, 1957
10 Claims. (Cl. 198—170)

This invention relates in general to conveying machinery and has specific reference to means for drivingly connecting or braking loads on roller, belt, chain or like conveyors.

More particularly, this invention is concerned with yielding driving blocks of plastic material intended for use as a substitute for the conventional and known spring devices employed in chain, belt or like conveyors for driving or braking loads transported thereon.

According to this invention, the driving blocks forming the subject-matter thereof comprise essentially a base portion adapted to be secured in any suitable manner on the circuit-forming driving element of the conveyor, for example a chain, belt or the like, this base portion having a branch-like arm inclined to the plane of travel of the aforesaid circuit-forming driving element and formed at its outer end with a suitably shaped heel adapted drivingly and detachably to engage the load carried by the conveyor.

This invention is characterized by the following advantageous features:

The driving blocks are extremely simple in design and therefore economical to manufacture, as they can be molded integrally without requiring any further machining step;

They need no maintenance at all, contrary to usual metal devices comprising return springs and pivot pins likely to become corroded;

Finally, their operation is absolutely noiseless and by selecting the proper plastic material for their manufacture their wear and tear may be reduced to insignificant values.

The driving blocks according to this invention may be mounted to work under bending, compressive or other stresses, as will be made clear in practical examples to be described presently.

In order to afford a clearer understanding of this invention and of the manner in which the same may be carried out in the practice, reference will now be made to the accompanying drawings illustrating diagrammatically by way of example a few typical embodiments of the driving blocks forming the subject-matter of this invention, in their application to chain-roller and belt conveyors. In the drawings:

FIGURE 4 is a diagrammatic view illustrating the function of the block of this invention on a descending portion of a conveyor section;

FIGURE 5 is a longitudinal fragmentary section illustrating on a larger scale the function of the block of this invention on an ascending portion of a conveyor section;

FIGURE 6 is a cross-section illustrating the mounting of a block of this invention on a belt conveyor;

FIGURE 7 is a lateral view showing a modified embodiment of a driving block according to this invention, and FIGURE 8 is a plane view from above of the block shown in FIG. 7.

Figure 1:
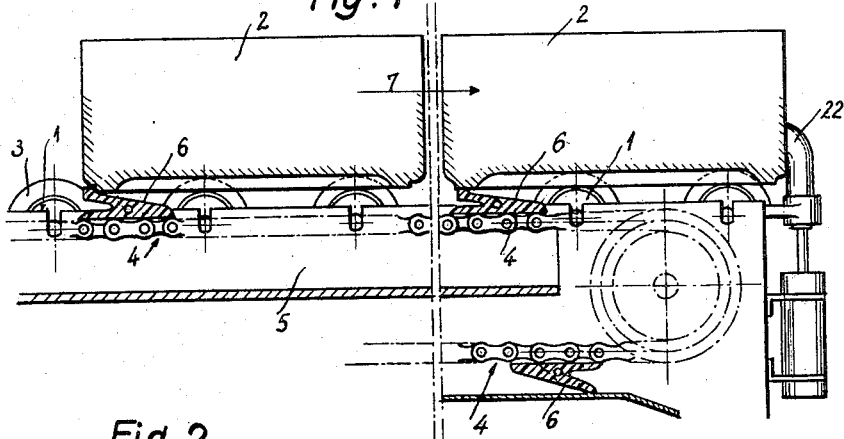
FIGURE 1 is a longitudinal fragmentary section showing a chain-roller conveyor equipped with blocks designed according to the teachings of this invention.

Referring first to FIG. 1 of the drawings, the reference numeral 1 designates the rollers of a roller conveyor on which the loads 2, for example material or parts handling cases, are caused to travel. These loads are guided between the registering flanges 3 of the rollers. This conveyor is of the conventional type comprising driving link chains 4 movable on a runway 5.

The loads 2 are caused to travel for example in the direction of the arrow 7 by driving blocks 6 secured at spaced intervals on the chain 4.

Figure 2:
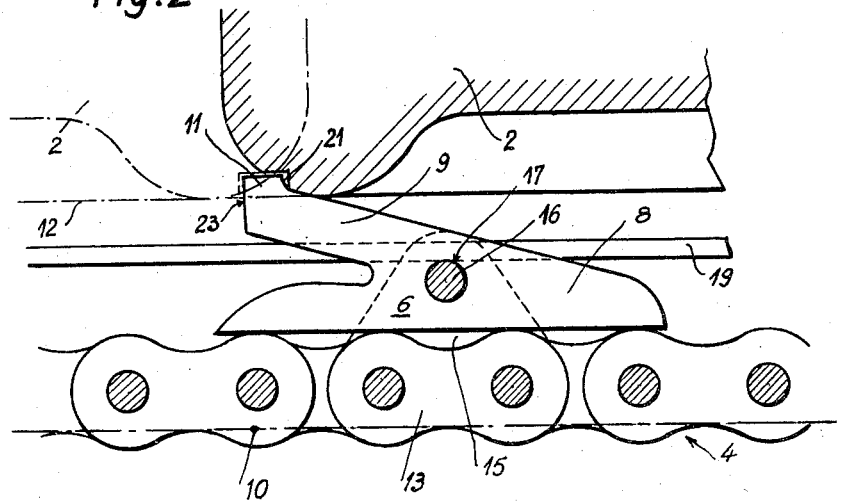
FIGURE 2 is a similar view showing on a larger scale the manner in which the blocks are mounted on the conveyor chain.

As shown more clearly in FIG. 2 the block 6 according to this invention comprises a base portion 8 from which extends an arm or branch portion 9 inclined relative to the plane of travel 10 of the member on which it is secured, in this case the link chain 4. On its outer end this branch portion 9 is formed with a heel 11 projecting somewhat above the lowermost plane of motion 12 of the loads 2.

In a conveyor of this character the block 6 is secured on a link 13 of the driving chain 4 through the medium of a supporting device 15 and a fixation pin 16 extending through a hole 17 formed in the base portion 8.

Figure 3:
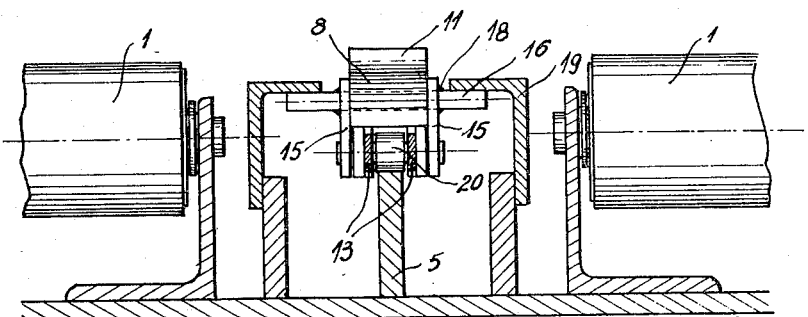
FIGURE 3 is a fragmentary cross-section showing the mounting of the block of FIG. 2 on a conveyor.

As illustrated in FIGS. 2 and 3 of the drawings, the block supporting device 15 consists of a pair of plates fitted on the ends of the pair of link pins, the fixation pin 16 being welded at 18 on the plates, as shown; besides, the base portion 8 of the block bears with its lower face on the chain links.

The fixation pin 16 of the block may advantageously be used to assist, in conjunction with angle irons 19, in guiding the chain 4 whereof the pins carry rollers 20 in rolling engagement with the runway 5 (FIG. 3).

The block according to this invention may be so mounted as to cause its arm 9 to work under bending stresses, as shown in the example of FIG. 1. Under these conditions the loads 2 are driven in the direction of the arrow 7 by the inclined face 21 of heel 11 which engages the rear lower edge of the loads (see FIG. 2).

With this specific arrangement it is possible gradually to accumulate loads at a predetermined location along the conveyor circuit, for example by providing a retractable stop member 22 (FIG. 1), the blocks or rather their arms 9 retracting automatically by bending under the loads driven thereby as the latter are stopped and as these arms clear the previously stopped loads. This structure is particularly advantageous for conveying loads along horizontal or very slightly inclined ascending paths.

In the case of a conveyor for relatively steep inclines (FIG. 4) wherein the loads are most likely to take by gravity an abnormal speed which it is desired to limit, it will be seen that the block of this invention is suitable for retaining the loads at a predetermined speed, the lower front edge of the loads abutting in this case against the retaining side 23 of the block so that its arm 9 is subjected to compressive stresses only.

This side 23 of the heel 11 is visible in FIG. 2, the load being shown in chain-dotted lines.

With this arrangement the block can be mounted in the manner already explained and shown and it is apparent that this mounting is suitable for stocking loads under the same conditions for example against the stop device shown diagrammatically at 22.

From the foregoing it will be seen that under certain conditions the blocks mounted on a same chain may be subjected sometimes to bending stresses, sometimes to compressive stresses, on two different sections of a same conveyor or conveyor element.

In the case of very steep inclines (see FIG. 5) and assuming the loads to be driven in the direction of the arrow 24, the block may be so mounted as to be subjected to compressive stress, the face 23 of its heel portion 11 pushing the load 2. Of course, this arrangement is unsuitable for the gradual stocking of loads as explained hereinabove.

Under these conditions it will be advantageous to shape the heel portion 11 of the block arm 9 as shown in FIG. 5, wherein a nose or lug 25 underlies the face 23 to prevent the compression-stressed arm 9 from yielding when the block engages the load. This lug 25 is formed with an inlet bevel or slope to facilitate the proper engagement of the load 2 by the heel 11.

The driving block according to this invention may also be attached in any desired and suitable manner on a belt or like conveyor 26 as illustrated in FIG. 6 wherein the block carries a transverse pin 27 assisting in guiding the belt. This transverse pin may be molded integrally with, or embedded in, the block.

FIGURES 7 and 8 illustrate a modified embodiment of the driving block of this invention; the essential feature of this design is its great resiliency in the axial direction, for example under flexure stress, while preserving all the desirable rigidity when subjected to compressive stress by virtue of a transverse and vertical slit 28 formed in the middle of the root of arm 9 between the outer face thereof and the transverse hole 17 in which the fixation or guide pin is fitted as in the preceding cases. With this arrangement the block is more flexible and therefore will yield more easily along short-radius curves.

These figures show a practical embodiment of a block subjected to compressive stress which abuts against a load 2 supported by a belt conveyor 26; the block is secured by its front end on the belt conveyor and for this purpose its base portion 8 is formed with a pair of holes 29 through which adequate rivets (not shown) can be inserted.

In addition and preferably the block is mounted on the belt by providing on its opposite or rear end a base-retaining bracket 30 secured on the belt proper.

Although a few embodiments of the driving block of this invention are shown and described herein, it will be readily understood that many modifications may be brought thereto without departing from the spirit and scope of the invention as set forth in the appended claims.

I claim:

1. For use with a conveyor means, a driving or holding dog comprising a one-piece member formed from flexible plastic material and having a base portion adapted to be attached to the conveyor means so as to have an upper surface and an arm portion angularly extending upwardly from the upper surface and terminating in a free load engaging end, said arm portion having sufficient inherent rigidity to work under compressive or bending stresses.

2. For use with a conveyor means to transport a plurality of load units, a driving or holding dog comprising a one-piece member formed from flexible plastic material and having a base portion adapted to be attached to the conveyor means so as to have an upper surface and an integral arm portion extending upwardly from the upper surface and terminating in a free load engaging end, said arm being inclined from the upper surface at an acute angle thereto, to engage a load unit in a driving or holding attitude and to suitably withstand the respective bending or compressive stresses.

3. For use with a conveyor means, a driving or holding dog comprising a one-piece driving block formed from a plastic material and having a base portion adapted to be attached to the conveyor means so as to have an upper surface and an arm portion extending upwardly from the upper surface and terminating in a free load engaging end, said arm being inclined with respect to the plane of motion of the conveyor means and said end having an integral hooking tip for engaging under the lower edge of a load.

4. For use with a conveyor means, a driving or holding dog comprising a one-piece member formed from flexible plastic material and having a base portion adapted to be attached to the conveyor means, said base portion having an upper surface and an arm portion extending upwardly from the upper surface and terminating in an integral free load engaging end, said arm being inclined with respect to the plane of motion of the conveyor means and said end having an integral hooking tip for engaging under the lower edge of a load, said tip, when the dog is operating in flexure, adapted to move under any loads stopped on the conveyor means and having, when each dog operates as a brace for a load, two rectangular supporting faces reciprocal with the loads.

5. For use with a conveyor means, a driving or holding dog comprising a one-piece member formed from flexible material and having a base portion adapted to be attached to the conveyor means so as to have an upper surface and an integral arm portion extending upwardly from the upper surface and terminating in a free load engaging end, said arm being inclined with respect to the plane of motion of the conveyor means and said end having a load engaging heel projecting above such plane of movement, said one-piece member adapted to work under compressive or bending stresses when said heel operatively engages the load.

6. For use with a conveyor means, a driving or holding dog comprising a one-piece member formed from flexible material and having a base portion adapted to be attached to the conveyor means, said base portion having an upper surface and an integral arm portion angularly extending upwardly from the upper surface and terminating in a free load engaging end, means carried by the base portion for attaching the dog to the conveyor means and said last means extending laterally from each side of the base portion to serve as a guide.

7. For use with a conveyor means, a driving or holding dog comprising a one-piece member formed from a plastic material and having a base portion adapted to be attached to the conveyor means, said base portion having an upper surface and an arm portion angularly extending upwardly from the upper surface and terminating in a free load engaging end, said arm portion dimensioned to work under bending or compressive stresses without any relative displacement between said integral base portion and the conveyor means, means integrally carried by the base portion transversely thereof for attaching the dog to the conveyor means and said last means extending from the base portion to serve as a guide.

8. For use with a conveyor means, a driving or holding dog comprising a one-piece member formed from a flexible plastic material and having a base portion adapted to be attached to the conveyor means, said base portion having an upper surface and an arm portion angularly extending upwardly from the upper surface and terminating in a free load engaging end, means carried by the base portion transversely thereof for attaching the dog to the conveyor means and said last means extending laterally from each side of the base portion to serve as a guide, said base portion having a transverse slit formed vertically therein at the root end of the arm portion between the outer face thereof and said last means to impart an improved resiliency thereto.

9. For use with a conveyor means, a driving or holding dog comprising a one-piece member formed from flexible plastic material and having a base portion adapted to be attached to the conveyor means, said base portion having an upper surface and an integral arm portion extending upwardly from the upper surface and terminating in a free load engaging end, said arm portion having a transverse slit formed vertically therein at the root end thereof to impart an improved resiliency thereto, said base portion having a transverse hole and a fastening member disposed in said hole for securing the base portion to the conveyor means, and said slit connecting the outer surface of said arm portion with the hole.

10. An apparatus according to claim 7, characterized in that said arm portion is provided with a transverse slit at its junction with said upper surface, said slit extending vertically and partially through said arm portion to communicate with said last means, to thereby impart to said arm portion an improved resiliency in the axial direction while preserving its rigidity when compression stressed.

References Cited in the file of this patent

UNITED STATES PATENTS

| | | |
|---|---|---|
| 161,903 | Rodgers | Apr. 13, 1875 |
| 948,678 | Bighouse | Feb. 8, 1910 |
| 1,856,733 | Shepherd | May 3, 1932 |
| 2,132,455 | Bishop | Oct. 11, 1938 |
| 2,742,863 | Burkitt | Apr. 24, 1956 |
| 2,780,342 | Good | Feb. 5, 1957 |